UNITED STATES PATENT OFFICE.

SAMUEL J. FOWLER, OF WESTFIELD, MASSACHUSETTS.

IMPROVEMENT IN EXPLOSIVE COMPOUNDS.

Specification forming part of Letters Patent No. 200,272, dated February 12, 1878; application filed April 13, 1877.

*To all whom it may concern:*

Be it known that I, SAMUEL J. FOWLER, of Westfield, county of Hampden, and State of Massachusetts, have invented certain new and useful Improvements in Explosive Compounds; and I do hereby declare the following to be a full, clear, and exact description of the same.

It is well known that nitrate of ammonia, when used as an ingredient in explosive compounds, furnishes a large quantity of gases which add materially to the force of the explosive; but the tendency to deliquesce which this salt shows is a great disadvantage. Its cost is also so great as in many cases to preclude its use.

The object of my invention is to obviate these two objections when it is used in explosive compounds; and my invention consists in an explosive compound consisting of the combination of nitrate of ammonia and non-hydrated sulphate of soda, either with or without charcoal or other solid carbonaceous material, and with an explosive, as will be fully hereinafter described.

To overcome the tendency of pure nitrate of ammonia to deliquesce, I form a combination of about seventy-five parts of nitrate of ammonia with about twenty-five parts of non-hydrated sulphate of soda, at a small cost, by the double decomposition of sulphate of ammonia and nitrate of soda.

By preference I use the following mode of preparing this combination, by which it can be produced cheaply: I dissolve sixty-six parts of sulphate of ammonia in hot water of about the same weight, and dissolve eighty-five parts of nitrate of soda in hot water of about half the same weight. I then pour the two solutions together and boil until the temperature of the liquid reaches 115° centigrade, or thereabout. I then decant the liquid from the precipitate of sulphate of soda, or remove the sulphate of soda from the liquid, and boil by direct fire until the temperature of the liquid reaches about 175° centigrade, removing the precipitate of sulphate of soda from time to time, as it may become necessary.

At a temperature of about 175° centigrade the liquid contains but a very small percentage of water, so that on cooling it becomes a hard and dry cake. It is therefore decanted while hot, and allowed to cool, and is then ready for use. The resulting cake consists of a combination of nitrate of ammonia and non-hydrated sulphate of soda, consisting of nitrate of ammonia from seventy to eighty parts, non-hydrated sulphate of soda from twenty to thirty parts, and a very small percentage of water, which latter may be removed, if found desirable or necessary, by evaporation. This combination is less hygroscopic than pure nitrate of ammonia, and, as above stated, of small cost.

In making my compound, I mix, in proper proportions, a portion of this combination, if found desirable or necessary, with a solid, as distinguished from liquid carbonaceous material, such as charcoal or finely-divided wood, and with an explosive, such as gunpowder, nitro-glycerine, gun-cotton, or nitro-methyl.

The compound I prefer to use consists of the combination of nitrate of ammonia and sulphate of soda with nitro-glycerine, and, when a solid carbonaceous material is to be employed, with charcoal, in about the following proportions: About twenty parts of nitroglycerine, or its equivalent; about seventy-five parts of the combination of nitrate of ammonia and sulphate of soda; about five parts of charcoal or its equivalent.

I have described the best mode with which I am acquainted for carrying out my invention; but I do not limit myself to the exact proportions stated, since variations may be made in all to adapt the explosive compound to the quality of the work to be done by it, without essentially changing my invention.

I do not herein claim the mode of making the combination of nitrate of ammonia and sulphate of soda above described, as this forms the subject-matter of a separate application for a patent made the 13th day of April, 1877, by me.

What I claim as new, and desire to secure by Letters Patent, is—

An explosive compound consisting of the combination of nitrate of ammonia and sulphate of soda with an explosive, substantially as described.

SAMUEL JONES FOWLER.

Witnesses:
G. R. KIMBALL,
G. WESSELLS, Jr.